(12) United States Patent
Wainwright

(10) Patent No.: US 6,196,505 B1
(45) Date of Patent: Mar. 6, 2001

(54) ADJUSTABLE PEDESTAL

(76) Inventor: Charles Wainwright, 686 Prospect Ave., West Springfield, MA (US) 01089

( * ) Notice: Under 35 U.S.C. 154(b), the term of this patent shall be extended for 0 days.

(21) Appl. No.: 09/289,215

(22) Filed: Apr. 9, 1999

(51) Int. Cl.[7] ............................. F16M 11/20; F16M 11/24
(52) U.S. Cl. ................................. 248/188.1; 248/188.2; 248/188.4
(58) Field of Search ................................ 248/188.1, 903, 248/188.4, 188.2; 411/418, 417, 437

(56) References Cited

U.S. PATENT DOCUMENTS

| | | |
|---|---|---|
| 2,128,522 | 8/1938 | Burns . |
| 2,384,020 | 9/1945 | Farson . |
| 2,750,709 | 6/1956 | Saverino . |
| 2,935,813 | 5/1960 | Berman . |
| 3,104,493 | * 9/1963 | Nalle ................................. 248/188.1 |
| 3,191,212 | * 6/1965 | Reiss, Sr. et al. ................ 248/188.1 |
| 3,464,662 | * 9/1969 | Myers ............................... 248/188.1 |
| 3,641,620 | 2/1972 | Hage . |
| 3,720,978 | 3/1973 | Miller, Jr. . |
| 4,653,968 | * 3/1987 | Rapata et al. ...................... 248/188.4 |
| 5,060,896 | 10/1991 | Hobbins . |
| 5,536,068 | * 7/1996 | Valentor et al. ................... 248/188.4 |
| 5,588,624 | 12/1996 | Woodham . |
| 5,678,892 | 10/1997 | Heitlinger . |
| 5,785,287 | 6/1998 | Hoshino . |

* cited by examiner

Primary Examiner—Anita M. King
Assistant Examiner—Jerome A. DeLuca
(74) Attorney, Agent, or Firm—William B. Ritchie

(57) ABSTRACT

An adjustable pedestal for insertion into a substantially cylindrical opening in a furniture or equipment leg. The pedestal includes a substantially cylindrical hollow insert and a foot. The insert includes a leg opening, a foot opening, and a leg portion disposed adjacent the leg opening. The leg portion has an outside diameter substantially equal to the inside diameter of the opening in the furniture or equipment leg and an inside surface into which are formed a plurality of threads. A cup portion is disposed adjacent the foot opening of the insert and has an outside diameter greater than the inside diameter of the opening in the furniture or equipment leg for preventing the insert from complete insertion within the leg. At least one retainer is formed within the insert for preventing rotation of the insert within the leg and for preventing withdrawal of the insert from the leg. The foot is substantially hollow and includes a shell end and an insert end. A threaded portion is disposed adjacent the insert end of the foot and has an outside surface into which a plurality of mating threads are formed to mate with the threads of the insert. A foot shell is disposed at the shell end of the foot and is dimensioned to mate with a foot attachment.

11 Claims, 4 Drawing Sheets

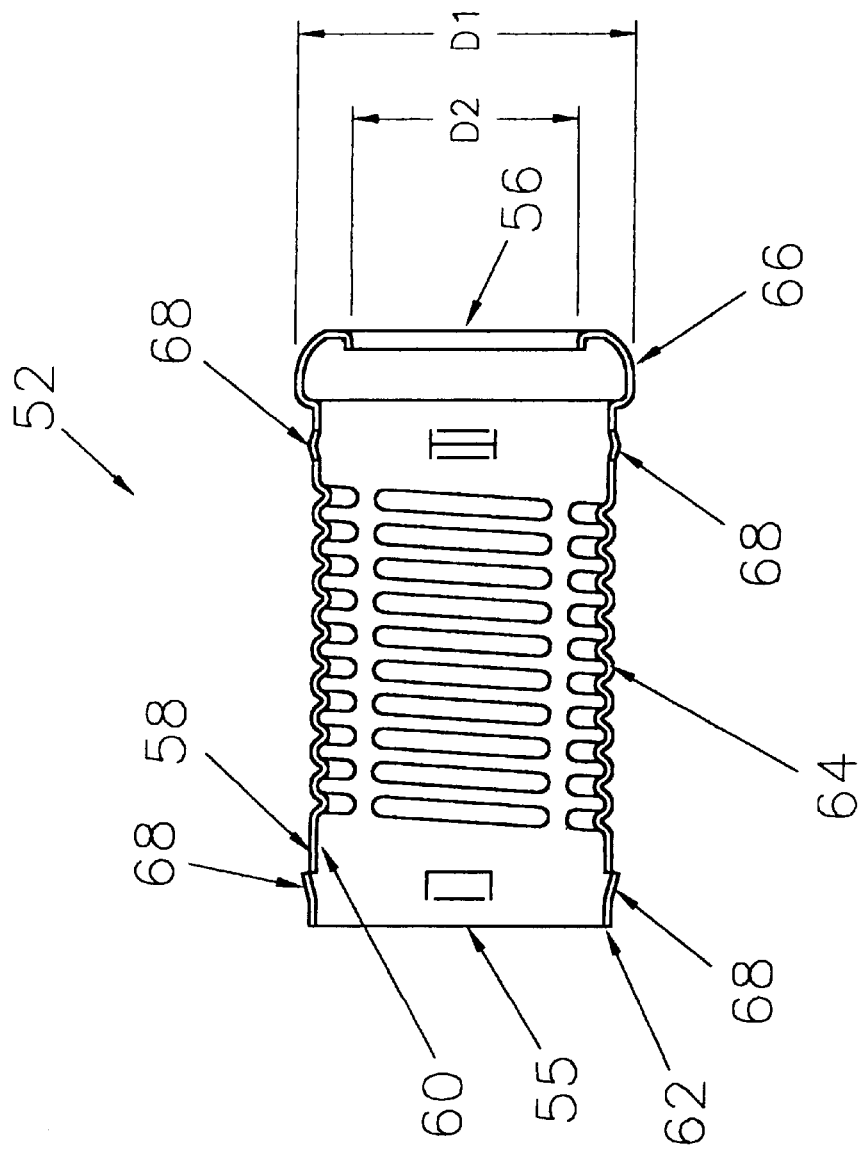
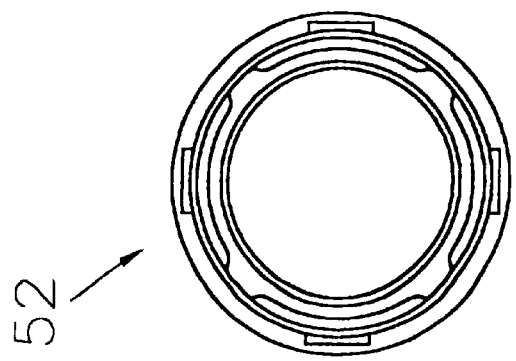
FIG. 3A
FIG. 3B

ADJUSTABLE PEDESTAL

FIELD OF THE INVENTION

The present invention relates to the field of pedestal inserts for insertion into furniture and equipment legs and, in particular, to height adjustable pedestal inserts for insertion into table legs, chair legs, and the like.

BACKGROUND OF THE INVENTION

The use of separate and adjustable feet adjacent to the bottoms of furniture and equipment legs is well known in the art. These feet provide a means for adjusting the height of each leg, allowing the legs to be leveled to insure the stable positioning of the furniture or equipment regardless of the unevenness of the floor on which it is placed.

A typical adjustable foot includes an insert portion that is inserted and retained within the furniture or equipment leg, and a threaded foot portion that threads into a hole within the insert portion to allow the foot to be adjusted upward and downward. These threaded portions have traditionally been manufactured of materials, such as zinc, into which threads are commonly machined. As these materials do not have an aesthetically appealing finish, it is often necessary to include sleeves and caps of a different material over the insert and foot portions to provide an appealing finish. In addition, the thickness of the threaded insert sections, coupled with the materials used, necessitates the use of a separate retaining ring to prevent these inserts from withdrawing from the furniture or equipment leg.

Although prior art leg inserts perform their desired function in a satisfactory manner, the number of parts of differing materials that are utilized, the machining steps involved in preparing those parts, and the assembly required to provide a finished insert, increase the cost of these leg inserts to a point where they are not cost effective for lower priced furniture or equipment. Thus, there is a need for an adjustable leg insert that minimizes the number of parts, eliminates the need for parts of differing materials, does not require extensive machining steps and is relatively simple to assemble, thus providing a simplified, yet functional and aesthetic, replacement for what now exists.

A number of United States Patents have issued relating to adjustable feet. However, none of these patents meets the above referenced need. For example, U.S. Pat. No. 2,384,020, titled "ADJUSTABLE LEG", discloses a leg that includes a leg insert that is adjusted through adjustment of a wedge portion within the leg. This adjustable leg is limited to substantially straight legs, has a limited range of adjustment and includes a number of component parts that must be assembled.

U.S. Pat. No. 2,750,709, titled "REVERSIBLE LIFT FOR FURNITURE LEGS", discloses an attachment to a straight furniture leg that frictionally locks the leg at a desired height. These lifts must also be used with substantially straight legs, and include a number of component parts of differing materials that must be machined to exacting tolerances and assembled.

U.S. Pat. No. 3,191,212, titled "ADJUSTABLE FLOOR GLIDE", discloses a threaded floor glide that mates with a plastic retainer within a furniture leg. Though requiring fewer parts, this glide still requires the use and assembly of machined parts, and parts of different materials. Further, the extension of the threaded portion beyond the level of the leg bottom exposes the threads, detracting from the aesthetic appeal of the chair.

U.S. Pat. No. 3,641,620, titled "FURNITURE GLIDE", discloses a glide assembly attached to a hollow lower portion of a furniture leg that includes a screw stud having a cylindrical plug projecting from the bottom of the leg upon which is supported a free moving vertically displaceable sleeve having a skirt slidable between the periphery of the plug and the walls of the leg. This glide, typical of many prior art designs, includes a multitude of machined parts and requires a substantial degree of assembly.

U.S. Pat. No. 3,720,978, titled "INDEXING FURNITURE GLIDE", discloses a glide that may be adjusted axially through the use of indexing leaf springs that are set on edge and resiliently biased against flats on a foot-ended stud that is threaded up to a nut fixed in the leg, so as to yieldably stop the stud at quarter turn intervals when the foot is rotated to thread the stud further up into or down from the nut. As described, this glide requires that a multitude of component parts be machined and assembled.

U.S. Pat. No. 5,536,068, titled "CHAIR WITH ADJUSTABLE LEGS", discloses an adjustment mechanism that includes an internally threaded insert sleeve received within a hollow area of the leg member and a leg extension having an external thread that is dimensioned to mate with the internal thread of the leg extension. This mechanism includes fewer component parts than other designs and, thus, is easier to assemble. However, the insert sleeve and threaded leg extension must both be machined to mate with each other and, as with other designs, the threads of the leg extension are exposed, detracting from the aesthetics of the chair.

Finally, U.S. Pat. No. 5,588,624, titled "TABLE LEG EXTENSION", discloses an extension for supporting a leg of a table that includes a receiving tube within which the leg is disposed, an abutment plate mounted within the tube for engaging and supporting the leg in a spaced relationship relative to the lower end of the tube, and a threaded member attached to the abutment plate. As with the other designs cited, this design requires a multitude of machined parts that must be assembled and results in an extension having exposed threads that detract from the aesthetics of the furniture to which it is mounted.

In the prior art, there is not found an adjustable leg insert that does not require a large number of parts, that eliminates the need for parts of differing materials, that does not require extensive machining steps, that is relatively simple to assemble, and that does not include exposed threads that detract from the aesthetics of the furniture or equipment to which it is mounted.

SUMMARY OF THE INVENTION

The present invention is an adjustable pedestal for insertion into a substantially cylindrical opening in a furniture or equipment leg. In its most basic form, the pedestal includes a substantially cylindrical hollow insert and a foot. The insert includes a leg opening, a foot opening, and a leg portion disposed adjacent the leg opening. The leg portion of the insert has an outside diameter substantially equal to the inside diameter of the opening in the furniture or equipment leg and an inside surface into which are formed a plurality of threads. A cup portion is disposed adjacent the foot opening of the insert. The cup portion has an outside diameter greater than the inside diameter of the opening in the leg for preventing the insert from complete insertion within the leg. At least one retainer is formed within the insert for preventing rotation of the insert within the leg and for preventing withdrawal of the insert from the leg. The foot is substantially hollow and includes a shell end and an insert end. A threaded portion is disposed adjacent the insert end of the foot and has an outside surface into which a plurality of mating threads are formed to mate with the threads of the insert. A foot shell is disposed at the shell end of the foot and is dimensioned to mate with a foot attachment.

In operation, the foot is inserted within the leg opening in the insert until the mating threads come into contact with the threads on the insert. The foot is then rotated to engage the mating threads with the threads of the insert such that the foot shell extends through the foot opening in the insert and the threaded portion of the foot is passed completely within the leg opening of the insert. The insert is then inserted within an opening in the furniture or equipment leg such that the retainer engages within the leg to hold the insert in a substantially fixed position. The foot is then rotated until extends a desired distance from the insert.

In the preferred embodiment, the threaded portion of the foot has a diameter larger than an inner diameter of the cup portion of the insert such that the foot is prevented from withdrawal from the insert. The preferred threads and mating threads are a plurality of ribs disposed at predetermined positions about the sides of the leg portion of the insert and threaded portion of the foot, respectively. Each typically has a peak to peak distance of between about 0.060 inches and about 0.312 inches, with a distance of about 0.167 inches being preferred. The retainer of the preferred pedestal retainer is four lanced locking tabs formed adjacent to the leg opening of the insert and four lanced locking tabs are formed adjacent to the cup portion of the insert. Finally, the preferred insert and foot are manufactured by stamping sheets of various material and of varying gage into the desired shapes. These stamping sheets are typically between about 13 gage to about 24 gage, with 20 gage stainless steel being preferred.

Therefore, it is an aspect of the invention to provide an adjustable pedestal that does not require a large number of parts.

It is a further aspect of the invention to provide an adjustable pedestal that eliminates the need for parts of differing materials.

It is a further aspect of the invention to provide an adjustable pedestal that does not require extensive machining steps.

It is a further aspect of the invention to provide an adjustable pedestal that is relatively simple to assemble.

It is a still further aspect of the invention to provide an adjustable pedestal that does not include exposed threads that detract from the aesthetics of the furniture or equipment to which it is mounted.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 3A is an end view of the preferred insert of the adjustable pedestal of the present invention.

FIG. 3B is a cut away side view of the preferred insert of the adjustable pedestal of the present invention.

DETAILED DESCRIPTION OF THE INVENTION

Figure 1:
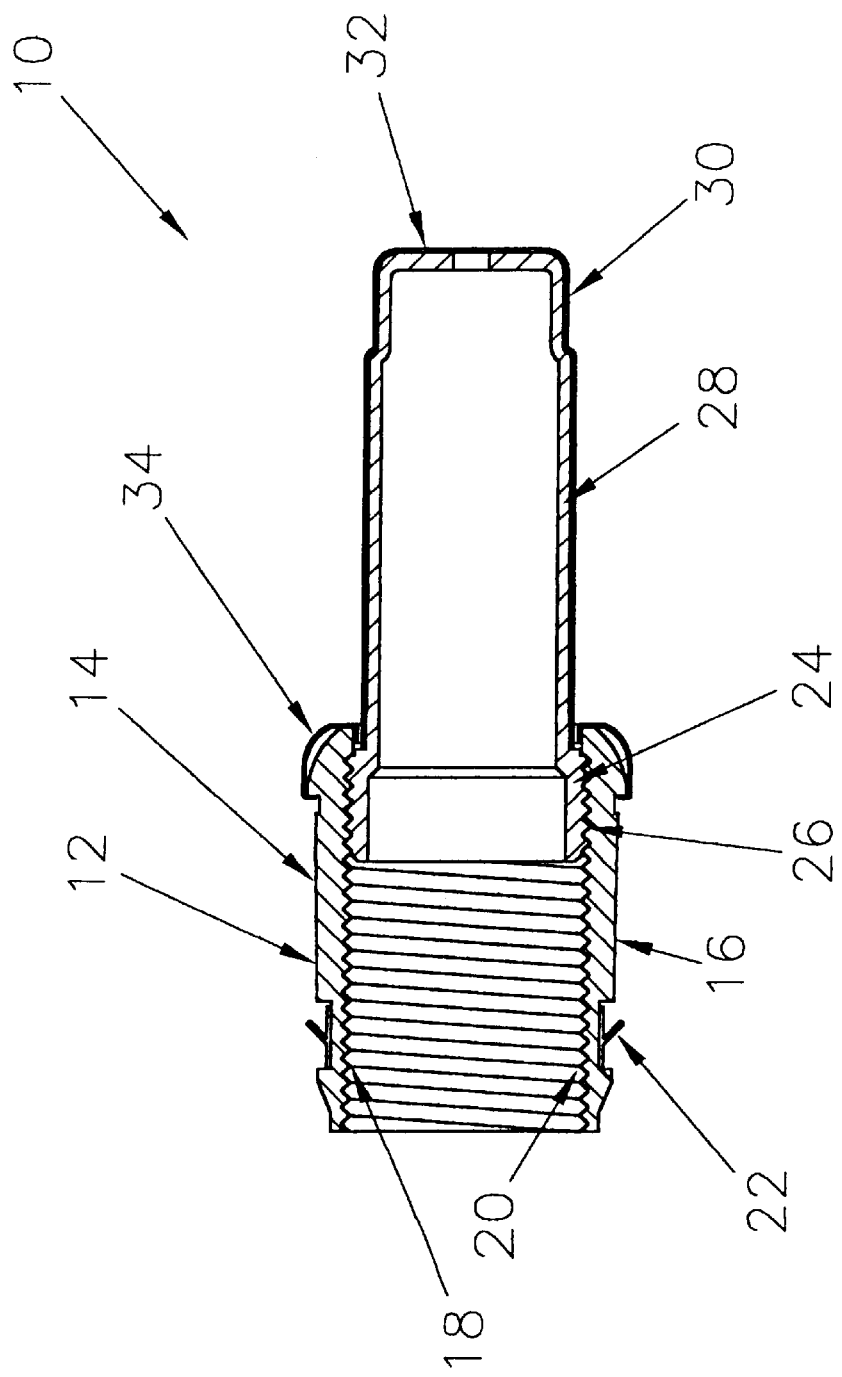
FIG. 1 is a cut away side view of a prior art adjustable pedestal.

Referring first to FIG. 1, a typical adjustable pedestal is shown. Typical pedestal feet 10 include four or five separate component parts, depending upon the need for a separate retaining ring, that are assembled to form the working pedestal. The first is the leg insert 12 that is inserted into the furniture or equipment leg (not shown). These leg inserts 12 are generally made of zinc and include an outer surface 14 having a series of ribs 16, which form channels within the inside surface of the leg to prevent rotation of the insert within the leg, and an inner surface 18 into which a series of threads 20 are machined. A retaining ring 22 is sometimes disposed about the outer surface of the leg insert and produces friction on the inside surface of the leg to prevent withdrawal of the leg insert once it is secured within the leg. A foot post 24 is provided for mating with the leg insert 12. The foot post 24 is typically manufactured of the same material as the leg insert 12 and includes a threaded portion 26 having a diameter to mate with the inside of the leg insert 12, and a non-threaded portion 28 having a smaller diameter. A foot sleeve 30 is disposed about the non-threaded portion 28 of the foot post 24. Foot sleeve 30 is typically manufactured of a material having an ornamental finish, such as stainless steel, and includes a foot portion 32 that is shaped to accommodate foot attachments. Finally, a finishing cap 34 is disposed at the mating point between the foot post 24 and the leg insert 12. The finishing cap 34 is typically manufactured of a material having the same ornamental finish as the foot sleeve 30 and acts as a finish piece to hide the bottom of the leg insert 12. In these embodiments, the downward travel of footpost 24 within the insert 12 is limited by the footpost opening diameter of the insert 12.

Figure 2:
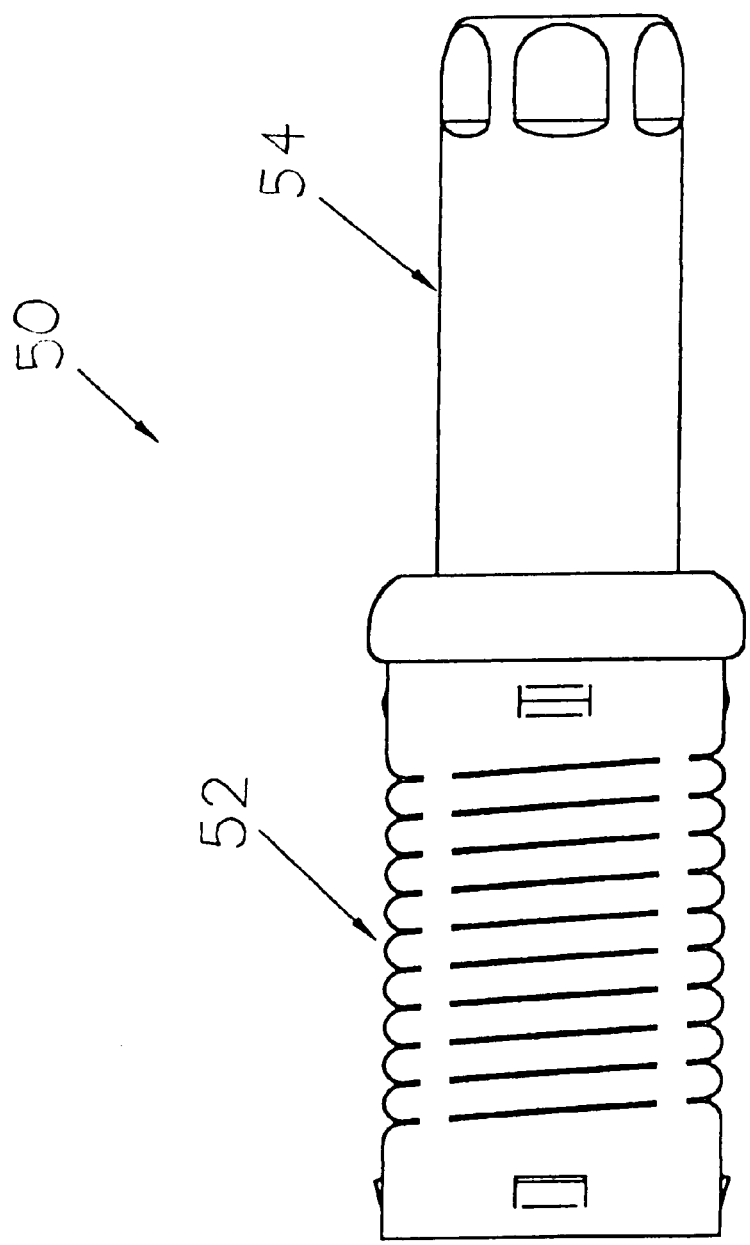
FIG. 2 is a side view of the preferred adjustable pedestal of the present invention.
Figure 4:
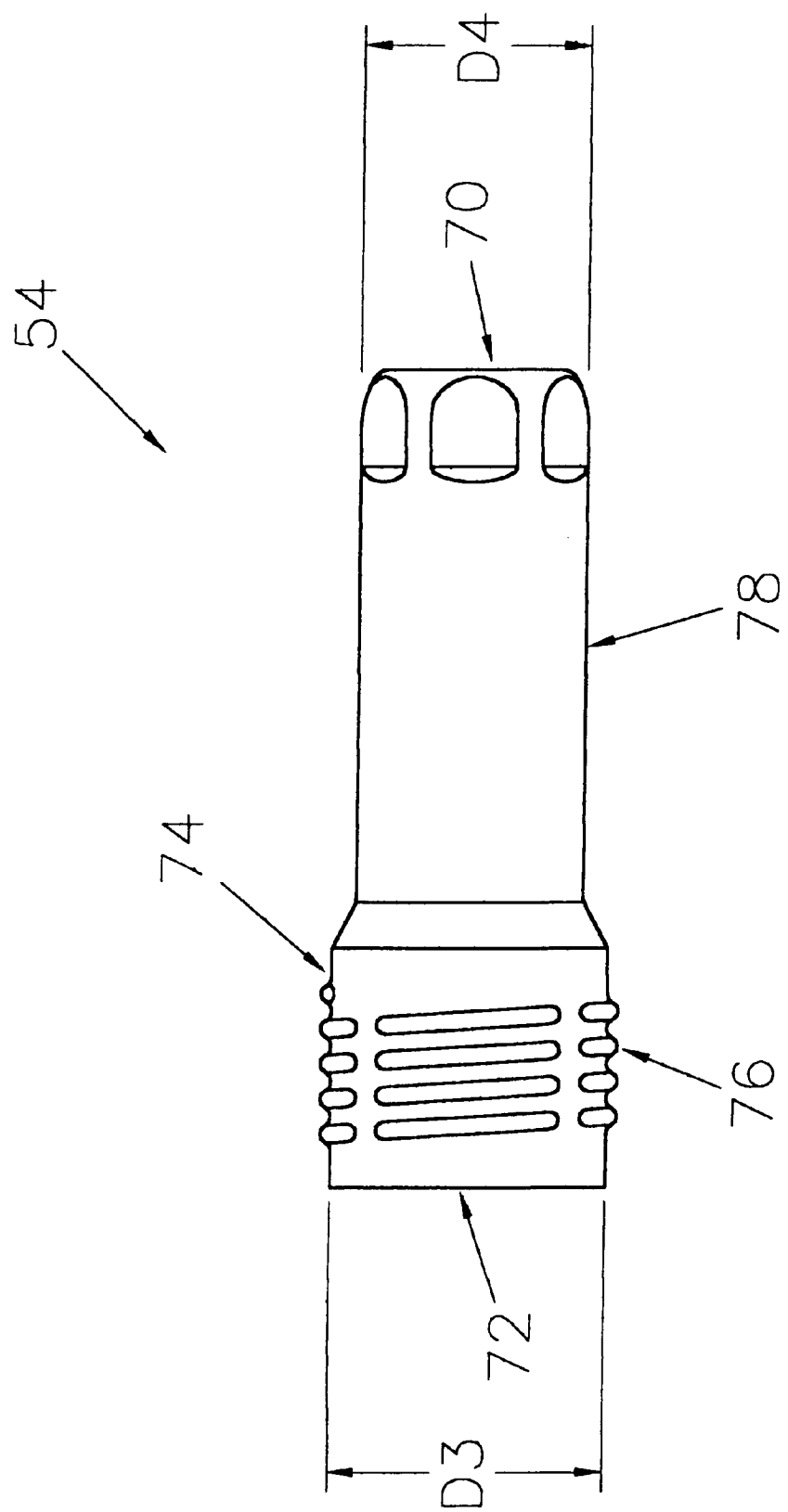
FIG. 4 is a side view of the preferred foot of the adjustable pedestal of the present invention.

Referring now to FIGS. 2–4, the preferred adjustable pedestal 50 of the present invention is shown. The pedestal 50 includes a substantially cylindrical hollow insert 52 dimensioned for insertion into a furniture or equipment leg (not shown) and a foot 54 that is dimensioned to adjustably mate with the insert 52 such that the level of the furniture or equipment leg may be adjusted. The preferred pedestal 50 is manufactured from two sheets of stainless steel that are stamped to form the insert 52 and foot 54. The stainless steel sheets typically have a thickness of between about 13 and about 24 gage, with 20 gage being preferred, and have an aesthetically pleasing brush finish. However, it is understood that other materials, having different thickness' and finishes, may be substituted, provided they may be formed into the insert 52 and foot 54 as described further herein.

As shown in FIGS. 3A and 3B, insert 52 is a substantially hollow cylinder having a leg opening 55 at one end and a foot opening 56 at the other end. Insert 52 includes a leg portion 58, disposed adjacent to the leg opening 55, that has an outside diameter substantially equal to the inside diameter of the opening in the furniture or equipment leg. The inside surface 60 sidewall 62 of the leg portion 58 includes a plurality of threads 64. It is preferred that threads 64 be formed within the material by a stamping procedure that deforms the material rather than removing a portion of it. The threads typically have a peak to peak distance of between about 0.060 inches and about 0.312 inches, with a distance of about 0.167 inches being preferred, and extend about four quarters of the outside surface of the insert.

A cup portion 66 is formed integrally with the sidewall 62 at a point adjacent to the foot opening 56 of the insert. The cup portion 66 preferably has an outside diameter D1 greater than the inside diameter of the opening in the furniture or equipment leg for preventing the insert from complete insertion within the leg. The foot opening 56 extends through cup portion 66 and has an inside diameter D2 that is greater than the diameter of the foot shell of the foot (shown in FIG. 4) to allow the foot shell to extend through the foot opening 56.

A plurality of retainers 68 are formed at predetermined locations about the insert 52 for preventing rotation of the insert 52 within the furniture or equipment leg and for preventing withdrawal of the insert 52 from the leg. In the preferred embodiment, these retainers 68 are lanced locking tabs that are formed by stamping the sidewalls 62 of the insert such that the tabs are lanced in the desired fashion. However, in other embodiments, raised bumps, ridges, or other retaining means known in the art, may be substituted to achieve similar results.

As shown in FIG. 4, the foot 54 has an insert end 72 and a shell end 70. The preferred foot 54 is substantially hollow and is formed of a single sheet of material through a stamping operation. A threaded portion 74 is disposed adjacent to the insert end 72 of the foot 54. The threaded portion 74 has a diameter D3 being slightly greater than the inside diameter D2 of the foot opening 56 and includes plurality of mating threads 76 formed along its outside surface. The mating threads 76 are preferably formed during the stamping process, rather than through machining, and are dimensioned to mate with the threads 64 disposed on the inside of the insert 52. The preferred mating threads 76 are formed along four quarters of the outside surface of the foot 54 and have a parabolic shape. However, in other embodiments, the threads extend completely around the circumference of the threaded portion 74 of the foot 54.

A foot shell 78 is formed integral to the threaded portion 74 and is disposed adjacent to the shell end 70 of the foot 54. The foot shell is preferably shaped as an industry standard bullet foot, which is dimensioned to mate with a foot attachment (not shown) such as an attachable glide. As shown in FIG. 4, the foot shell has a diameter D4 that is less than the diameter D3 of the threaded portion 74. However, in other embodiments, the threaded portion 74 and foot shell 78 are substantially the same diameter. In these embodiments, the downward travel of the foot 54 within the insert 52 are limited by the diameter D2 of the cup portion 66 of the insert 52.

In operation, the foot is inserted within the leg opening 55 in the insert 52 until the mating threads 76 come into contact with the threads 64 on the insert 52. The foot 54 is then rotated to engage the mating threads 76 with the threads 64 of the insert 52 such that the foot shell 78 extends through the foot opening 56 in the insert 52 and the threaded portion 74 of the foot 54 is passed completely within the leg opening 55 of the insert. The insert 52 is then inserted within an opening in the furniture or equipment leg such that the retainer 68 engages within the leg to hold the insert 52 in a substantially fixed position. The foot 54 is then rotated until extends a desired distance from the insert 52.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An adjustable pedestal for insertion into a substantially cylindrical opening in a leg, said pedestal comprising:

a substantially cylindrical hollow insert having a leg opening and foot opening, said insert comprising:
   a leg portion disposed adjacent to said leg opening of said insert, said leg portion having an outside diameter substantially equal to an inside diameter of said opening in said leg and an inside surface into which are formed a plurality of threads comprising a plurality of ribs disposed at predetermined positions about said leg portion;
   a cup portion disposed adjacent to said foot opening of said insert, said cup portion having an outside diameter greater than said inside diameter of said opening in said leg for preventing said insert from complete insertion within said leg; and
   at least one retainer for preventing rotation of said insert within said leg and for preventing withdrawal of said insert from said leg; and a substantially hollow foot having a shell end and an insert end, said foot comprising;
   a threaded portion disposed adjacent to said insert end of said foot, said threaded portion having an outside surface into which a plurality of mating threads are formed comprising a plurality of ribs disposed at predetermined positions about said foot, said mating threads being dimensioned to mate with said threads of said insert; and
   a foot shell disposed at said shell end of said foot;

wherein said foot is inserted within said leg opening in said insert, said foot is rotated to engage said mating threads with said threads of said insert such that said foot shell extends through said foot opening in said insert, said insert is inserted within said opening in said leg such that said retainer is engaged, and said foot is rotated until said foot extends a desired length from said insert.

2. The adjustable pedestal as claimed in claim 1 wherein said threaded portion of said foot has a diameter larger than an inner diameter of said cup portion of said insert such that said foot is prevented from withdrawal from said insert.

3. The adjustable pedestal as claimed in claim 1 wherein said plurality of threads formed into said inside surface of said leg portion comprise a plurality of ribs disposed at about said leg portion such that a peak of one rib is disposed at a distance of between about 0.060 inches and about 0.312 inches from a peak of another rib.

4. The adjustable pedestal as claimed in claim 1 wherein said plurality of mating threads formed into said outside surface of said threaded portion of said foot comprise a plurality of ribs disposed about said foot portion such that a peak of one rib is disposed at a distance of between about 0.060 inches and about 0.312 inches from a peak of another rib.

5. The adjustable pedestal as claimed in claim 1 wherein said at least one retainer comprises a plurality of lanced locking tabs formed in predetermined locations about said insert.

6. The adjustable pedestal as claimed in claim 5 wherein four of said lanced locking tabs are formed adjacent to said leg opening of said insert and four of said lanced locking tabs are formed adjacent to said cup portion of said insert.

7. The adjustable pedestal as claimed in claim 1 wherein said insert and said foot are manufactured of stainless steel.

8. The adjustable pedestal as claimed in claim 7 wherein said insert and said foot are manufactured of stainless steel having a thickness of between about 0.02 and 0.10 inches.

9. An adjustable pedestal for insertion into a leg, said pedestal comprising:
- a substantially cylindrical hollow insert having a plurality of threads comprising a plurality of ribs disposed at predetermined positions; and
- a substantially hollow foot having a threaded portion into which a plurality of mating threads are formed comprising a plurality of ribs disposed at predetermined positions about said foot, said mating threads being dimensioned and positioned to engage with said threads of said insert;

wherein said foot is inserted in said insert, said foot is rotated to engage said mating threads with said threads such that the pedestal has an adjustable height.

10. The adjustable pedestal as claimed in claim 9 wherein said plurality of threads formed in said insert are formed by a stamping procedure that deforms said insert.

11. The adjustable pedestal as claimed in claim 9 wherein said plurality of mating threads formed in said foot are formed by a stamping procedure that deforms said foot.

* * * * *